June 30, 1942.   W. M. PARSONS   2,288,367
TUBE STILL
Filed May 2, 1940   2 Sheets-Sheet 1
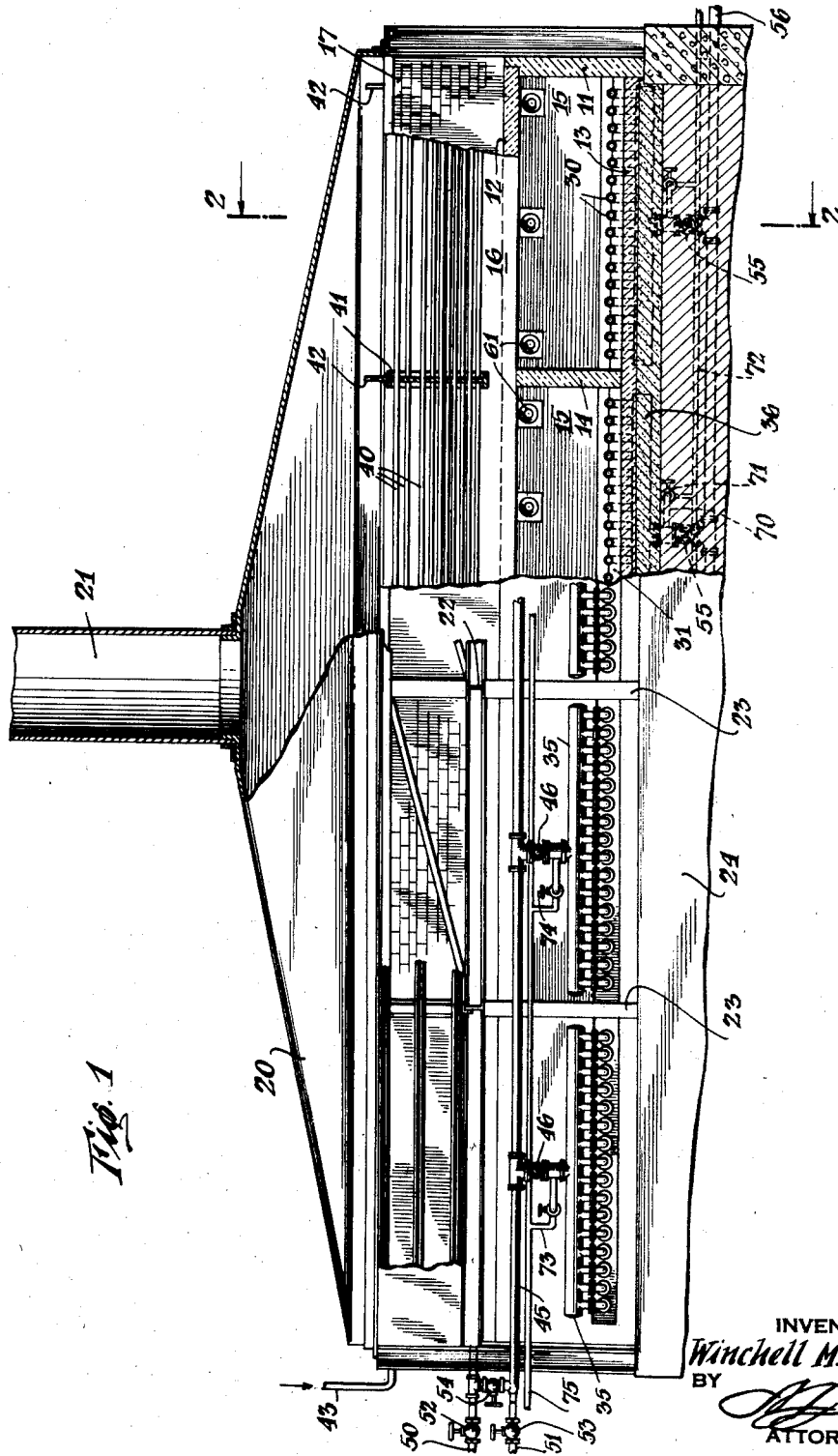
INVENTOR
Winchell M. Parsons
BY
ATTORNEY

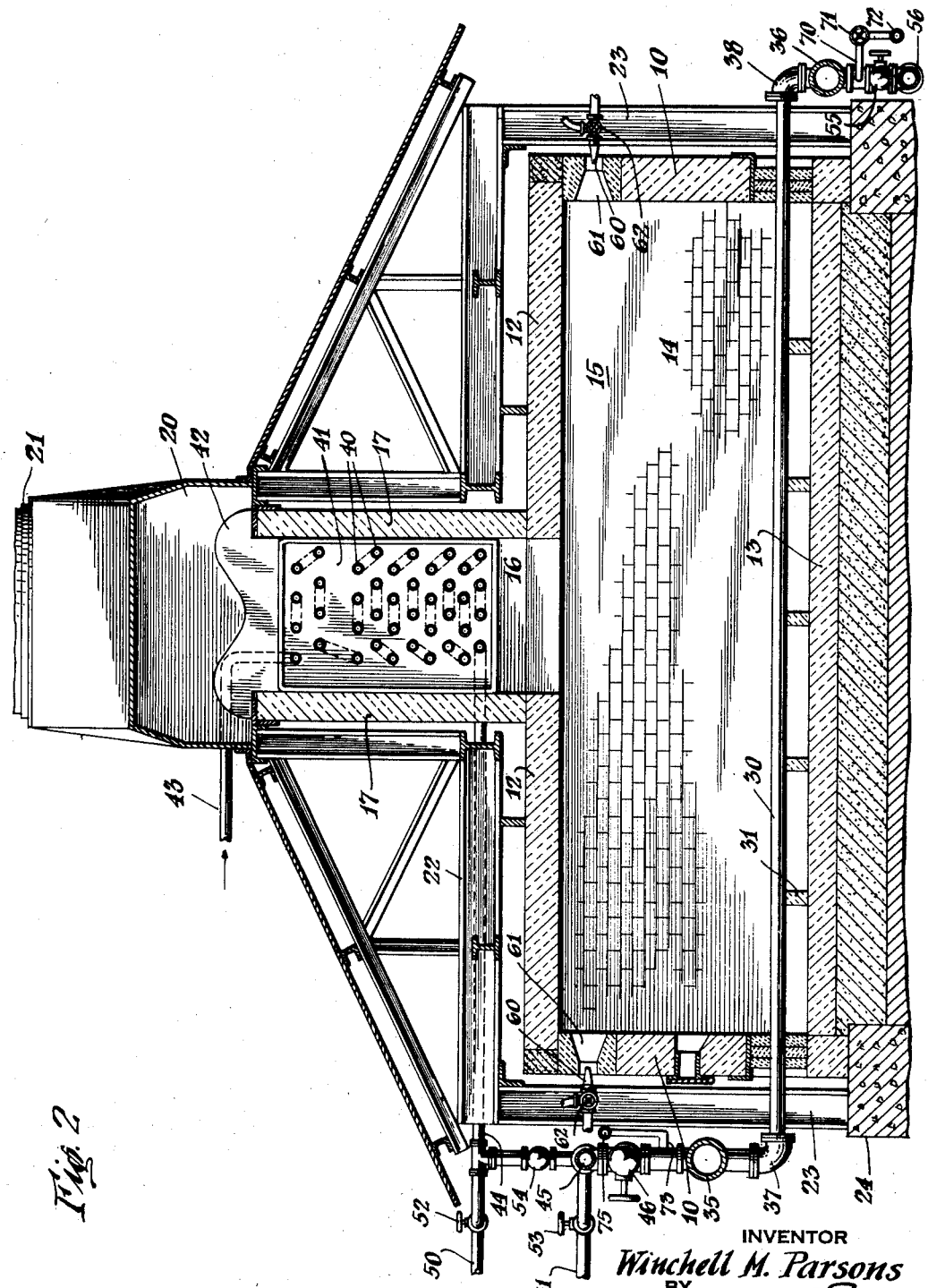

Patented June 30, 1942

2,288,367

UNITED STATES PATENT OFFICE 2,288,367

TUBE STILL

Winchell M. Parsons, Alhambra, Calif.

Application May 2, 1940, Serial No. 332,901

5 Claims. (Cl. 196—116)

This invention relates to tube stills and more particularly to furnaces suited to heat a fluid to the high temperatures required for the pyrolytic or catalytic conversion of hydrocarbons.

In certain processes of the above type it is necessary first to heat the hydrocarbon oils to or above the vaporizing temperature, but below the temperature at which conversion takes place under the conditions of operation or, in the case of gases, to preheat the same to a suitable temperature below that at which conversion takes place and subsequently to raise the gases or vapors rapidly and under controlled conditions to conversion temperature. The present invention provides a furnace for this purpose in which the conversion takes place in a split stream utilizing banks of parallel connected tubes so arranged that all tubes are subjected to identical heating conditions which may be accurately controlled as to total heat transfer and as to heat distribution along the tubes.

An object of the invention is to provide a furnace of the above type which is so constructed and arranged that rapid and efficient heat transfer is obtained for heating the fluid to the high temperature required for conversion during its passage through the heating zone.

Another object is to provide a furnace of the above type in which a selected bank or banks of tubes may be periodically removed from stream for purposes of reactivation, regeneration, burning out the carbon deposited therein or repair, while maintaining a substantially constant throughput and without materially altering the heat available for the preheating zone.

Another object is to provide a furnace of the above type which is suited to the commercial operation of various catalytic or pyrolytic conversion processes.

Another object is to provide a furnace of the above type having simplified and improved details of construction and conditions of operation.

Various other objects and advantages will be apparent as the nature of the invention is more fully disclosed.

In one embodiment the furnace is of the double end-fired type having an elongated combustion chamber provided with a horizontal bank of horizontal conversion tubes extending longitudinally of the furnace and having burners located in both ends of the furnace to fire longitudinally thereof in a direction parallel to the conversion tubes. The burners are arranged in banks extending parallel to the bank of conversion tubes so that the various tubes may be subjected to identical heating conditions. The burners may be regulated so as to control the distribution of heat along the various tubes.

In the embodiment shown, the converter tubes are located along the floor of the furnace and the burners are arranged to fire parallel to and adjacent the roof so that the roof is heated to radiance thereby. In certain instances the burners may be inclined toward the roof so as to cause the flame and hot combustion gases to sweep along the under surface of the roof for the purpose above indicated. However, the natural tendency of the flames and hot gases to rise in the combustion chamber assists in causing them to maintain a sheet of flame adjacent the roof and may be sufficient in itself without inclining the burners.

The converter tubes, which may contain a catalyst, are heated in part by direct radiation from the flame and hot combustion gases, in part by direct radiation from the roof, in part by reflected radiation from the floor of the furnace and in part by convection.

The combustion zone is shown as divided into a plurality of individual combustion chambers by a set of vertical transverse walls. The tubes in each of said combustion chambers are connected to headers to form an individual bank of parallel-connected tubes. The burners may also be connected in groups so that the flow of fluid through the individual banks of tubes and the combustion in the individual chambers may be controlled as desired. This arrangement permits a bank of tubes, together with the corresponding burners, to be shut down when desired without affecting the operation of the remaining banks.

In the embodiment shown, the furnace is divided into four separate combustion chambers so arranged that any three tube banks may be operated simultaneously, one bank of tubes being placed on stream prior to the shutting down of a second bank. In this way the throughput is maintained substantially constant as distinguished from the so-called batch operation where the catalyst zone is first heated and is then placed on stream until the temperature has fallen below a predetermined point.

A feature of the invention resides in the reduction of the percentage of the capacity of the furnace which is off-stream for reactivation purposes at any one time, with a consequent increase in over-all on-stream efficiency. In the embodiment shown it will be noted that 75% of the total capacity may always remain in use, thereby making possible a substantially continuous operation in spite of the necessity for periodic reactivation.

The furnace is also provided with a convection chamber which is located in the roof of the furnace and extends transversely across all of the combustion chambers so as to receive combustion gases therefrom. The tubes are arranged horizontally in this convection zone and also extend along the entire length of the furnace to be heated by combustion gases received from each of the combustion chambers. Hence, if the same number of combustion chambers are operated at all times, the same total quantity of combustion gases will be available for heating the convection tubes regardless of which one or more of the combustion chambers may be shut down at any instant. The convection tubes are carried in tube sheets which may be supported by the roof truss of the furnace. The conversion tubes, being positioned along the furnace floor, may be supported on suitable floor blocks, as will be described.

Another feature of the invention resides in the arrangement of the various parts so that the construction and maintenance thereof is simplified. The floor tubes may be readily installed or removed.

Although the novel features which are believed to be characteristic of this invention are pointed out more particularly in the claims appended hereto, the nature of the invention will be better understood by referring to the following description, taken in connection with the accompanying drawings in which a specific embodiment thereof has been set forth for purposes of illustration.

In the drawings:

Fig. 1 is an end elevation of a furnace embodying the present invention with parts broken away to show the details of construction thereof; and Fig. 2 is a transverse section taken along the line 2—2 of Fig. 1.

Referring to the drawings more in detail, the furnace is shown as comprising a pair of end walls 10, side walls 11, roof 12 and floor 13 forming an elongated horizontal combustion zone. A plurality of longitudinal walls 14 divide this zone into a plurality of separate combustion chambers 15. A convection zone 16 is formed by a pair of side walls 17 which extend upwardly from the roof of the furnace. The convection zone is shown as extending across the entire furnace about midway between the end walls 10 so as to receive combustion gases from each of the combustion zones 15. It may, however, be located off center or even at one end of the furnace if desired. In the latter case one wall 17 of the convection zone 16 may be formed as an upward continuation of the adjacent end wall 10. A hood 20 may be provided over the convection zone 16 to receive the combustion gases therefrom and to direct the same to a stack 21.

The roof 12 and the walls 17 are shown as supported by a roof truss 22 which is carried by buck-stays 23 located at the ends of the furnace and resting upon suitable foundations 24.

A bank of horizontal conversion tubes 30 extends adjacent the floor of the furnace in each of the combustion chambers 15. The tubes 30 extend through suitable openings in the end walls 10 and rest upon supports 31 which are disposed in spaced relationship along the floor 13. The tubes in each combustion chamber may be connected at one end to an inlet header 35 and at the other end to an outlet header 36, preferably by means of flanged elbows 37 and 38 respectively which may be disconnected to permit the removal of the individual tubes.

A bank of convection tubes 40 is located in the convection zone 16. These tubes 40 extend along the entire furnace over the various combustion chambers 15 and are shown as carried in tube sheets 41 provided with yokes 42 which are supported directly from the roof truss 22. The tubes 40 may be series connected to provide for the serial flow of a fluid therethrough. Fluid may be supplied to said tubes through an inlet pipe 43 and after being heated therein may be removed through an outlet pipe 44. The outlet pipe 44 is shown as connected to a line 45 which is connected through valves 46 to the individual inlet headers 35 so as to supply the preheated fluid to the various banks of converter tubes. Lines 50 and 51 are connected to the line 44 and to the line 45 respectively to permit the fluid from the convection zone to be removed from the furnace for other treatment before being returned to the converter tubes and also to permit different fluids to be treated in the convection and conversion zones if desired. Valves 52 and 53 may be provided in lines 50 and 51 and a valve 54 may be provided in the line 44 to permit control of the flow of fluid for the above purpose. The outlet headers 36 are connected through valves 55 to a discharge line 56.

A row of burners 60 having throats 61 are positioned in the end walls 10 of the furnace to direct flame and combustion gases substantially horizontally beneath the roof 12. The burners are preferably spaced along the end walls to provide a substantially continuous sheet of flame and combustion gases beneath the roof and may be controlled by individual valves 62 or the burners in each combustion chamber 15 may be controlled as a group. The combustion gases pass along beneath the roof 12 and enter the convection zone 16 through which they pass on their way to the stack 21.

The outlet headers 36 are connected by lines 70 controlled by individual valves 71 to a blow down line 72. The supply headers 35 are connected by lines 73 controlled by individual valves 74 to a supply line 75 through which steam and/or air may be supplied to the headers for purposes of reactivation, regeneration or cleaning, as will be described.

In the operation of this furnace the burners 60 are so adjusted as to maintain the roof 12 in radiant condition, whereby heat is transferred to the tubes 30 by radiation from the flame and hot combustion gases, by radiation from the surface of the roof 12, and by reflection from the floor 13. Heat is also transferred to the tubes 30 by convection from the combustion gases.

The inclination of the burners, in combination with the tendency of the hot gases to rise in the combustion chamber and the draft, cause the flame and combustion gases to pass along adjacent the roof without coming in direct contact with the tubes 30. This prevents the tubes from burning out due to contact with the flames and highly heated gases which might otherwise occur. However, the circulation of the combustion gases may cause some of the gases to contact with the tubes so as to impart additional heat thereto by convection.

The heat distribution along the tubes 30 may be controlled by adjusting the burners 60 so as to vary the rate of combustion, the length of the luminous portion of the flame and the point of contact of the flame with the roof 12. The burners in the opposite end walls 10 may be adjusted independently for the above purpose. By firing longitudinally of the tubes 30 it is possible to maintain substantially identical heating conditions for all of the tubes and also to control the heat distribution as desired.

The combustion gases from all of the individual combustion chambers 15 pass through the convection zone 16 in contact with the tubes 40 therein, thereby preheating the fluid in said tubes before the gases pass to the stack 21. It is usually preferable to connect the tubes 40 for the serial flow of fluid through the entire bank of tubes, although the bank may be otherwise connected if desired.

In certain instances the burners in the end wall, for example, the wall adjacent the inlet header 35, may constitute the primary source of heat for the fluid in the converter tubes 30, in which event the burners in the end wall adjacent the outlet header 36 may be used to supply additional controlled quantities of heat to the portion of the converter tubes near the outlet end thereof or vice versa. The burners in the two ends of the furnace may be regulated independently to supply the necessary heat to the corresponding portions of the converter tubes or the burners in one end wall may be omitted or may be used as auxiliary heat sources as desired. In either event, the arrangement above described provides for regulation of the heat distribution along the converter tubes so as to produce the desired operating characteristics.

The furnace is so arranged that the individual banks of tubes 30 may be removed from stream and cleaned or reactivated when necessary as, for example, to remove or burn out carbon which may become deposited therein. This is particularly important in the case of a catalytic converter wherein frequent reactivation of the catalyst may be required. It is also important in the case of a pyrolytic converter wherein carbon deposition may take place, although the cleaning may be required only at less frequent intervals. The present construction provides for the removal of the tubes from stream by closing the appropriate valves 46 and 55. The reactivation fluid such, for example, as steam or a mixture of steam and air may then be supplied to the tubes by opening the appropriate valve 74 and the reactivation products may be passed directly to the blow-down line 72 by opening the appropriate valve 71.

During this reactivation, the burners in the particular combustion chamber containing the bank of tubes being reactivated or cleaned may be shut down or the temperature thereof may be reduced as desired. Inasmuch as the reactivation or cleaning usually involves an exothermic reaction, the temperature of the tubes may be maintained at the desired value without the introduction of additional heat from the burners. Preferably, superheated steam is first passed through the tubes to blow out any vapors which may be present therein and which might form an explosive mixture. Thereafter, air or a mixture of air and steam may be passed through the tubes to burn out the carbon deposit and to reactivate or clean the catalyst. The quantity of air may be regulated so as to prevent overheating of the tubes. After reactivation, superheated steam may again be passed through the tubes to purge the same of products of reactivation and air before the tubes are again placed on stream. By using the superheated steam at about the temperature of operation of the tubes, the reactivation may be accomplished without appreciable cooling of the tubes and without delay for again bringing the same up to temperature before they are returned to stream.

It will be noted that in the furnace shown three banks of tubes may be maintained on stream at all times while the fourth bank is being reactivated. Consequently, the combustion gases from three of the combustion chambers are always available for heating the tubes 40 in the convection zone. This results in a substantially uniform heat supply for the convection tubes regardless of the particular combustion chamber which may be shut down at any instant. By increasing the number of separate combustion chambers, the ratio of useful capacity may be increased to any desired value.

The above described arrangement is such that the fluid, such, for example, as hydrocarbon fluid, may first be preheated in the convection zone 16 to raise the same to a temperature below conversion temperature. The heated fluid may then be passed directly to the conversion tubes 30 wherein it is rapidly heated to conversion temperatures and under conversion conditions.

The arrangement is such that the rapid heat transfer may take place to the conversion tubes 30 without causing local overheating of the fluid. It is to be understood, of course, that the preheated fluid may be removed to a separate treating apparatus if desired before passage to the conversion tubes 30, valves 52, 53 and 54 being provided for this purpose.

The above described furnace is particularly applicable to catalytic and pyrolytic conversion processes for the treatment of hydrocarbons, but is capable of various other uses, modifications and embodiments as will readily appear to a person skilled in the art. The invention is only to be limited in accordance with the following claims.

What is claimed is:

1. A furnace for heating fluids, comprising a roof, floor and side and end walls forming a rectangular combustion zone, a plurality of separated longitudinal division walls parallel to said side walls dividing said combustion zone into a plurality of separate combustion chambers, a horizontal bank of horizontal converter tubes in each combustion chamber extending along but spaced from the floor thereof and out of the main path of the flame and hot combustion gases, the tubes extending parallel to said side walls, inlet and outlet headers connected to provide for the parallel flow of fluid through the converter tubes of each bank, a convection chamber containing a bank of convection tubes located in said roof and extending transversely across all of said combustion chambers to receive combustion gases therefrom, said convection chamber being comparatively narrow in section whereby a substantial roof area is obtained for said combustion chambers, and a horizontal row of burners firing parallel to said converter tubes, said burners being arranged to heat the roof to radiance whereby said converter tubes are heated by radiant heat from the flame and from said roof.

2. A furnace for heating fluids, comprising a roof, floor and side and end walls forming a rectangular combustion zone, a plurality of separated longitudinal division walls parallel to said side walls dividing said combustion zone into a plurality of separate combustion chambers, a horizontal bank of horizontal converter tubes in each combustion chamber extending along but spaced from the floor thereof and out of the main path of the flame and hot combustion gases, the tubes extending parallel to said side walls with their ends projecting through the opposite end walls, inlet and outlet headers located beyond the respective end walls of each chamber and connected to provide for the parallel flow of fluid through the converter tubes of each bank, a convection chamber containing a bank of convection tubes located in said roof and extending transversely across all of said combustion chambers to receive combustion gases therefrom, said convection chamber being located about midway between the ends of said combustion chambers and being comparatively narrow in section whereby a substantial roof area is obtained on each side of said convection chamber, and a horizontal row of burners in each end wall near said roof, firing parallel to said converter tubes towards said convection chamber, said burners being arranged to heat the roof to radiance whereby said converter tubes are heated by radiant heat from the flame and from said roof.

3. A furnace for heating fluids, comprising a roof, floor and side and end walls forming a rectangular combustion zone, a plurality of separated longitudinal division walls parallel to said side walls dividing said combustion zone into a plurality of separate combustion chambers, a horizontal bank of horizontal converter tubes in each combustion chamber out of the main path of the flame and hot combustion gases, the tubes extending parallel to said side walls with their ends projecting through the opposite end walls, inlet and outlet headers located beyond the respective end walls of each chamber and connected to provide for the parallel flow of fluid through the converter tubes of each bank, a convection chamber containing a bank of convection tubes located in said roof and extending transversely across all of said combustion chambers to receive combustion gases therefrom, said convection chamber being located about midway between the ends of said combustion chambers and being comparatively narrow in section whereby a substantial roof area is obtained on each side of said convection chamber, a horizontal row of burners in each end wall near said roof firing substantially horizontally and parallel to said converter tubes towards said convection chamber, said burners being arranged to heat the roof to radiance whereby said converter tubes are heated by radiant heat from the flame and from said roof, a roof truss connected to support said roof, said convection chamber having side walls extending upwardly above said roof and supported by said roof truss, and tube sheets carrying said bank of convection tubes also supported by said roof truss.

4. A furnace for heating fluids, comprising a roof, floor and side and end walls forming a rectangular combustion zone, a plurality of separated longitudinal division walls parallel to said side walls dividing said combuston zone into a plurality of separate combuston chambers, a horizontal bank of horizontal converter tubes in each combustion chamber out of the main path of the flame and hot combustion gases, the tubes extending parallel to said side walls with their ends projecting through the opposite end walls, inlet and outlet headers located beyond the respective end walls of each chamber and connected to provide for the parallel flow of fluid through the converter tubes of each bank, a convection chamber containing a bank of convection tubes located in said roof and extending transversely across all of said combustion chambers to receive combustion gases therefrom, said convection chamber being located about midway between the ends of said combustion chambers and being comparatively narrow in section whereby a substantial roof area is obtained on each side of said convection chamber, a horizontal row of burners in each end wall near said roof firing substantially horizontally and parallel to said converter tubes towards said convection chamber, said burners being arranged to heat the roof to radiance whereby said converter tubes are heated by radiant heat from the flame and from said roof, and means associated with the respective inlet and outlet headers for selectively shutting down said banks of converter tubes whereby one of said banks may be removed from stream without interfering with the operation of the remaining banks or with the flow of combustion gases through the convection zone.

5. A furnace for heating fluids, comprising a roof, floor and side and end walls forming a rectangular combustion zone, a plurality of separated longitudinal division walls parallel to said side walls dividing said combustion zone into a plurality of separate combustion chambers, a single horizontal row of horizontal converter tubes in each combustion chamber extending along but spaced from the floor thereof and out of the main path of the flame and hot combustion gases, the tubes extending parallel to said side walls with their ends projecting through the opposite end walls, inlet and outlet headers located beyond the respective end walls of each chamber and connected to provide for the parallel flow of fluid through the converter tubes of each bank, a convection chamber containing a bank of convection tubes located in said roof and extending transversely across all of said combustion chambers to receive combustion gases therefrom, said convection chamber being located about midway between the ends of said combustion chambers and being comparatively narrow in section whereby a substantial roof area is obtained on each side of said convection chamber, and a horizontal row of burners in each end wall near said roof, firing parallel to said converter tubes towards said convection chamber, said burners being arranged to heat the roof to radiance whereby said converter tubes are heated by radiant heat from the flame and from said roof.

WINCHELL M. PARSONS.